Jan. 2, 1968     M. W. ST. CLAIR     3,360,885
POTTED PLANT ROTATOR
Filed July 24, 1961     2 Sheets-Sheet 1
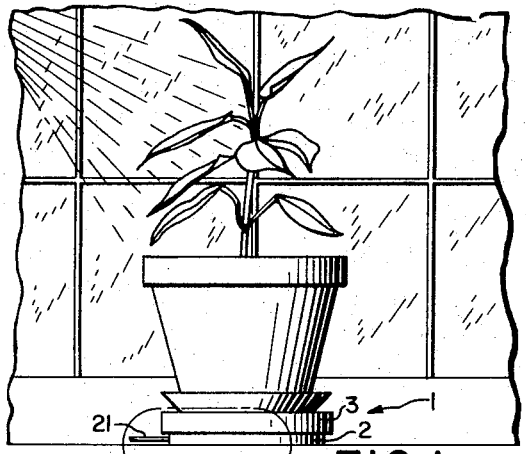
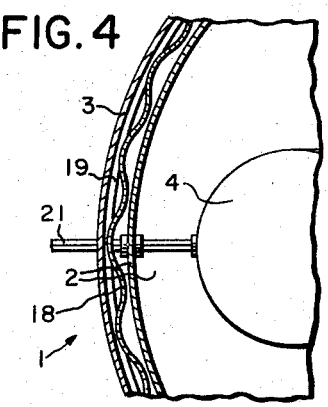
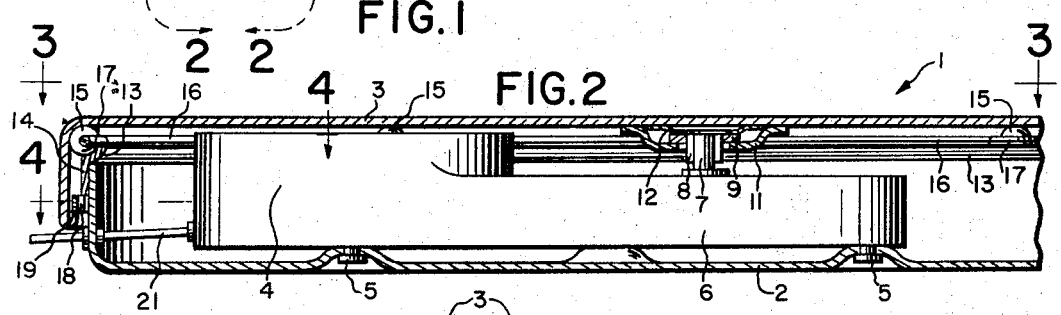
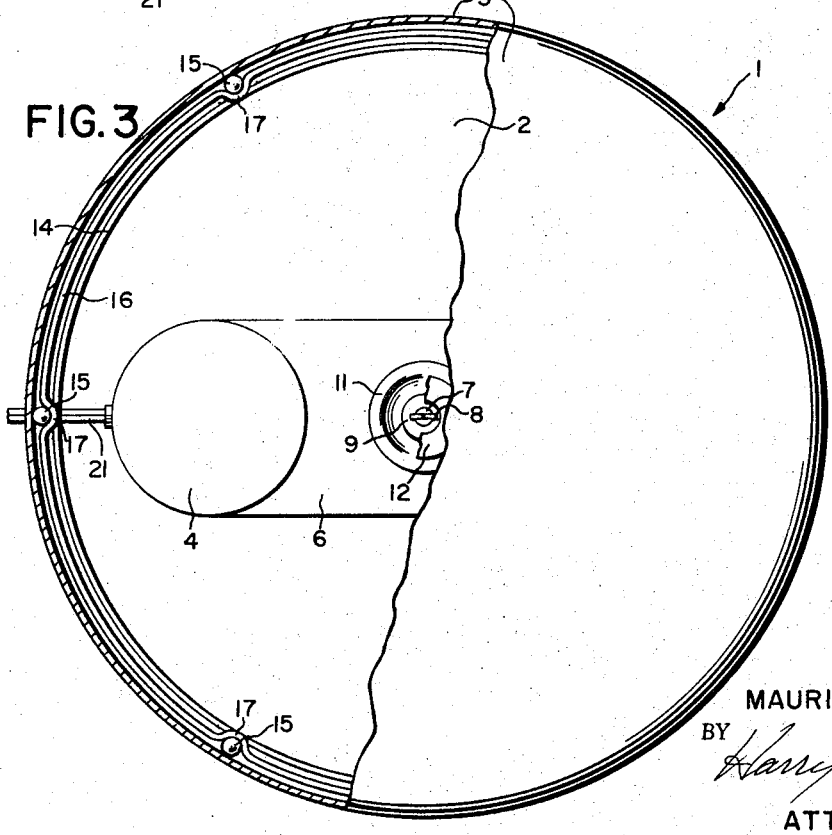
INVENTOR.
MAURICE W. ST. CLAIR
BY
ATTORNEY

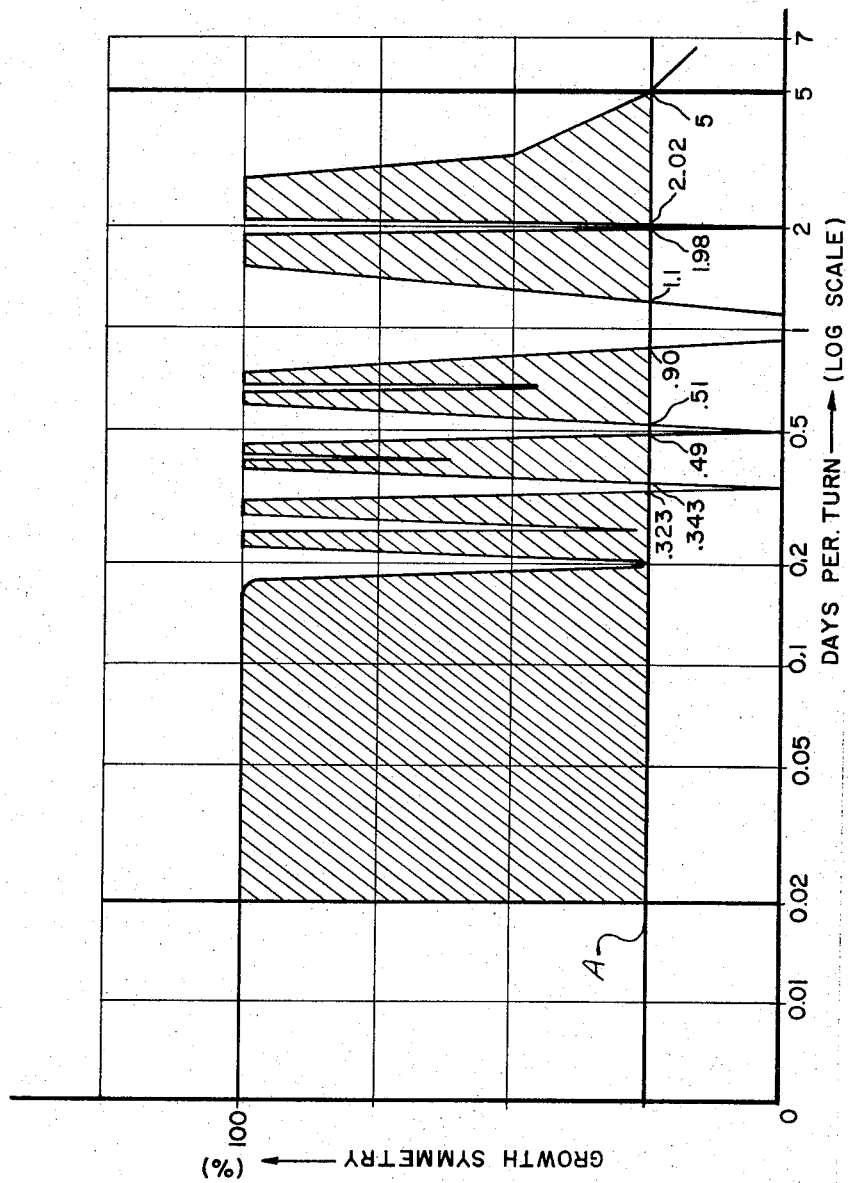

United States Patent Office 3,360,885
Patented Jan. 2, 1968

3,360,885
POTTED PLANT ROTATOR
Maurice W. St. Clair, 425 Encinal Ave., Apt. B,
Menlo Park, Calif. 94025
Filed July 24, 1961, Ser. No. 126,252
3 Claims. (Cl. 47—40)

The present invention relates in general to potted plant rotators and, more specifically, to method and apparatus for rotating potted plants to obtain symmetrical plant growth.

It has been found that unless a light seeking house grown potted plant, for example, a philodendron pertusum, is rotated its branches and leaves will tend to grow toward the source of light as, for example, a nearby window, and thereby produce unsymmetrical growth of the plant as taken about a vertical central axis of the plant. Such unsymmetrical growth is generally considered undesirable and it is to be avoided if possible.

In the present invention there is provided a relatively simple and inexpensive electric motor driven plant rotator for continuously rotating house grown potted plants at an imperceptible rate to produce symmetrical plant growth as taken about a vertical axis coextensive with the stalk and hereinafter referred to as symmetrical plant growth.

The principal object of the present invention is to provide a simple and inexpensive potted plant rotator for enhancing symmetrical plant growth.

One feature of the present invention is the provision of method and apparatus for rotating potted plants to enhance symmetrical growth.

Another feature of the present invention is continuous rotation of the potted plant at an imperceptible speed.

Another feature of the present invention is the provision of a set of certain preferred speeds of continuous plant rotation whereby symmetrical plant growth is obtained.

Another feature of the present invention is the provision of a simple and inexpensive plant rotator including a housing formed by two coaxially disposed, and axially coextensive cup structures, one of the cups being rotatable with respect to the other, whereby the rotator may be made of as pleasing a design as possible.

Another feature of the present invention is the same as the preceding feature including a bearing assembly disposed between the two cup structures and carried at the lip of the stationary cup structure to provide an inexpensive sturdy bearing support for the rotatably cup structure which in turn supports the plant.

Another feature of the present invention is the same as the two preceding features wherein the two cup structures are shallow and disposed in mutually opposing relationship whereby the rotator may be made relatively thin and inconspicuous.

Another feature of the present invention is the provision of a frictional clutch in the plant rotator drive mechanism to prevent damage to the drive motor or associated apparatus caused by inadvertent stoppage or forced turning of the otherwise rotatable parts.

Other features and advantages of the present invention will become apparent upon a perusal of the specification taken in connection with the accompanying drawings wherein:

FIG. 1 is a side elevational view of the plant rotator of the present invention, FIG. 2 is an enlarged cross-sectional fragmentary view of a portion of the structure of FIG. 1 delineated by line 2—2, FIG. 3 is a reduced cross-sectional plan view of a portion of the structure of FIG. 2 taken along line 3—3 in the direction of the arrows, FIG. 4 is an enlarged detail view of a portion of the structure of FIG. 2 taken along line 4—4 in the direction of the arrows, and FIG. 5 is a graph of plant growth symmetry vs. rotator speed.

Referring now to the figures there is shown therein a plant rotator of the present invention. More specifically, the plant rotator includes a housing 1 formed by two mutually opposed, coaxially disposed and axially coextensive shallow cup-shaped structures 2 and 3. The lower shallow cup-shaped structure 2 forms the base support structure for the plant rotator and is preferably formed as by drawing from a relatively light gauge metal as of, for example, 0.030" sheet steel. The upper shallow cup-shaped structure 3 forms the turntable and is made of slightly larger diameter than the lower or base cup structure 2 and is made of the same material in the same way.

The term shallow as applied to the cup structures 2 and 3 as used throughout this disclosure shall mean a cup which has a diameter at least four times greater than its height. The height being as small as economically possible to keep the device as inconspicuous as possible.

An electrical motor 4 is fixedly secured to the base cup structure 2 via a plurality of sheet metal fasteners 5. The electric motor assembly 4 includes a suitable gear train portion 6 which rotationally drives a shaft 7 upwardly extending from the gear train portion 6.

The drive shaft 7 includes a key 8 which rides within a suitable key slot in a clutch plate 9 such that the clutch plate 9 is rotationally locked to the drive shaft 7 via the key 8.

An outwardly flanged centrally apertured drive plate 11 is fixedly secured centrally of the turntable 3 as by spot-welding. A centrally apertured spring washer 12 is disposed in between the clutch plate 9 and the table 3 and produces a frictional load between the clutch plate 9 and the drive plate 11 to urge relative rotation of the turntable 3 with the drive shaft 7. The drive shaft 7 is disposed in axial alignment with the stationary base support cup 2 and the turntable cup 3. The spring force exerted by the spring washer 12 is selected to provide sufficient frictional drive to overcome normal expected loads on the turntable 3 and to permit relative slippage between the clutch plate 9 and the drive plate 11 when excessive rotational loads are presented to the drive shaft 7 from the turntable 3.

A ring-shaped bearing race 13 is fixedly secured to and carried from the lip of the base cup structure 2. The bearing race 13 is preferably made of a relatively light gauge pressed metal and includes a skirt portion 14 extending axially coextensively with the side wall portion of the base support cup 2 in abutting contiguous peripheral contact therewith. The skirt portion 14 of bearing race 13 is fixedly secured to the support cup 2 as by spot-welding.

A plurality of ball bearings 15 as of, for example, $\frac{3}{16}$" diameter balls are disposed at equal angular intervals about the circumference of the bearing race 13. The equal angular separation of the bearings 15 is maintained by retaining wire 16 formed with inwardly directed indentations at 17 for capturing and retaining the ball bearings at the proper angular relationship. The ball bearings 15 are disposed between the turntable 3 and the base support 2 and serve to take the axial and transverse components of the load placed on the turntable 3 by the potted plant and to transmit this load to the base support cup 2 via the bearing race ring 13. The outer or near outer peripheral positioning of the bearings facilitates use of the rotator with relatively large axially eccentric loads.

A scalloped locking ring 18 is disposed between the side wall portions of the base support cup 2 and the turntable cup 3 and serves to lock the turntable 3 to the base support cup 2 in the axial direction by being captured between the lower edge of the skirt portion 14 of the bearing race 13 and the inwardly directed lip 19 of the turntable cup 3. Locking ring 18 is preferably loosely captured between the race 13 and lip 19 to prevent adding frictional load to the turntable 3.

In operation, electrical power is supplied to the motor 4 via lead 21 from a suitable power source, not shown. The motor 4 rotationally drives shaft 7 through the intermediary of the gear train 6 thereby causing the turntable 3 to produce rotation of the plant.

In a preferred embodiment of the present invention the motor 4 and gear train 7 are selected to produce imperceptible movement of the turntable 3. More specifically, imperceptible movement as used herein is defined to mean an angular velocity of the turntable 3 of less than 50 turns per day, or in other words, more than 0.02 day per turn.

Using angular speeds below the perceptible range (speeds below 0.02 day per turn), the plant rotator does not produce distracting noises and distracting plant movements which could otherwise be encountered with more rapid rotation.

It has been discovered, however, that not all speeds below the perceptible range are useable. More particularly, speeds below a certain point, that is, one turn every five days, produce unsymmetrical plant growth. Also, certain other imperceptible plant rotating speeds are highly undesirable.

Accordingly, FIG. 5 shows a graph of plant growth symmetry vs. rotator speed with a certain degree of plant symmetry marked as useable. Those plant rotator speeds, shown as "days per turn," for which there is a hatched area above line A of FIG. 5 are preferred while all the remaining plant rotator speeds are generally much less desirable. These plant rotator speeds which correspond to the unhatched portion of FIG. 5 correspond to lower order integral fractions or multiples of a day. When the plant rotation speed corresponds to a lower integral fraction or multiple of a day such as, for example, 0.5 day or 2.0 days, one side of the plant will "see" more of the sun than another side of the plant causing that portion of the plant which sees more of the sun to grow in that direction. The light seeking plants will grow in such a manner as to cause their leaves to "see" a maximum amount of sunlight. Those plant rotator speeds slower than five days per turn will cause a perceptible amount of plant growth to occur toward the light source or window during one revolution of the plant. Once the growth has been formed in an unsymmetrical manner, these branches and leaves of the plant will continue to remain in the unsymmetrical position and will not again grow back to a condition of symmetry while the plant rotates. The plant rotator speeds faster than 0.02 days per turn correspond to speeds producing perceptible motion of the plant to an observer and these speeds are considered undesirable because rotation of the plant is distracting. When the plant rotator speeds correspond to the hatched area above line A of FIG. 5 the plant leaves become displaced in a manner which gives the plant an over-all symmetry obtained in a process of the leaves seeking the available light and the leaves will jockey for position to obtain maximum available light such that the leaves are not hidden behind each other. An optimum condition of plant symmetry is thus obtained.

What is claimed is:
1. Apparatus for rotating potted plants to enhance symmetrical growth including, a shallow cup-shaped structure forming a stationary base support with the open portion of said cup-shaped structure extending away from the base support, a rotatable cup structure adapted to receive and support a potted plant therefrom and serving to close off the open end of said first cup-shaped stationary structure, said second rotatable cup structure having a larger diameter than said first cup-shaped structure and being disposed in mutually opposed relationship with said first cup-shaped member with the side walls of said cup-shaped members being axially coextensive, a ring closely fitting around the periphery of the side wall of said first cup-shaped member and having an inwardly directed lip portion of said ring forming a bearing race structure shaped to contain ball bearings, a plurality of ball bearings carried within said shaped lip portion and disposed between said lip portion and said rotatable cup member in supporting bearing engagement with the bottom of said rotatable cup and the bearing race structure of said lip portion of said ring for rotatably supporting said second rotatable cup member from the lip of said stationary cup structure, said second rotatable cup member having an inwardly directed portion, means outwardly projecting from said stationary cup structure, a scalloped locking ring captured in between said outwardly projecting means from said stationary cup structure and the inwardly directed portion of said rotatable cup structure, and said locking ring having a vertical extent substantially the same as the vertical distance between the lower surface of said outwardly projecting means from said stationary cup structure and the upper surface of said inwardly directed portion of said rotatable cup and having a horizontal extent sufficient to span said surfaces for locking said mutually opposed cup structures in axially overlapping relationship, and a motor carried within said stationary cup structure and serving to rotationally drive said rotatable cup structure via the intermediary of a clutch means.

2. The apparatus according to claim 1 wherein said clutch means includes a clutch plate rotatably locked to a drive shaft of said motor, a drive plate fixedly secured to said rotatable cup-shaped structure, and a spring washer carried in between said cup structure and said clutch plate for urging said clutch plate against said drive plate carried from said rotatable cup structure.

3. The apparatus according to claim 1 including, a peripherally scalloped retaining circular spring wire for positioning said ball bearings in spaced apart locations about the periphery of the lip of said stationary cup structure for evenly distributing the load from the rotatable cup structure to the stationary cup structure.

References Cited
UNITED STATES PATENTS

| | | | |
|---|---|---|---|
| 1,208,457 | 12/1916 | Belleville. | |
| 1,451,515 | 4/1923 | Niemczewski | 47—39 |
| 1,468,247 | 9/1923 | Patten. | |
| 1,479,618 | 1/1924 | Mansbendel. | |
| 1,789,513 | 1/1931 | Burrage | 47—17 |
| 2,939,330 | 6/1960 | Margetts. | |

ABRAHAM G. STONE, *Primary Examiner.*

T. G. CRAVER, *Examiner.*

P. RAZZANO, *Assistant Examiner.*